United States Patent [19]

Kimmel et al.

[11] Patent Number: 4,664,899

[45] Date of Patent: May 12, 1987

[54] METHOD OF PRODUCING MONOTUNGSTEN CARBIDE POWDER

[75] Inventors: Edward R. Kimmel, Sayre; Mary E. Shaffer, Towanda; Thomas R. Pinkowski, Sayre; Geoffrey L. Harris, Monroeton, all of Pa.

[73] Assignee: GTE Products Corporation, Stamford, Conn.

[21] Appl. No.: 504,697

[22] Filed: Jun. 15, 1983

[51] Int. Cl.[4] ............................................. C01B 31/30
[52] U.S. Cl. ..................................... 423/440; 423/439
[58] Field of Search ................................ 423/439, 440

[56] References Cited

U.S. PATENT DOCUMENTS 4,008,090  2/1977  Miyake et al. ...................... 423/440

*Primary Examiner*—John Doll
*Assistant Examiner*—Jackson Leeds
*Attorney, Agent, or Firm*—Robert E. Walter

[57] ABSTRACT

Tungsten carbide is produced by mixing tungsten oxide or ammonium paratungstate with carbon to form a mixture which is substantially reduced in a non-reducing atmosphere in the presence of sufficient carbon to produce a carbon content in the resulting mixture of less than seven percent by weight, and adding sufficient carbon to the resulting reduced mixture to increase the carbon content to at least the stoichiometric amount needed to form monotungsten carbide prior to carburization of the mixture to monotungsten carbide.

1 Claim, No Drawings

METHOD OF PRODUCING MONOTUNGSTEN CARBIDE POWDER

The invention is directed to the production of tungsten and tungsten carbide in powder form. More particularly, this invention is directed to the production of tungsten and tungsten carbide powder having increased mechanical stability.

There are generally two forms of tungsten carbide. Monotungstate carbide has the formula WC, and ditungsten carbide has the formula $W_2C$. Of the two, WC is more applicable for use in the manufacture of many objects such as, without limitation, dies and cutting and drilling tools. In producing such dies as tools, the WC form of tungsten carbide powder may be combined with a bonding agent such as cobalt and sintered together to form what is known in the art as a cemented carbide structure.

The standard process for making monotungsten carbide powder consists of a solid state carburization of tungsten powder. The basic processing steps required are:

(a) Calcining of ammonium paratungstate or tungstic acid to one of the stable forms of tungsten oxide ($WO_3$, $WO_{2.83}$, $WO_{2.65}$, $WO_2$).

(b) Reduction of the oxide form to tungsten metal powder in hydrogen at temperatures in excess of 700° C.

(c) Mixing tungsten metal powder with a powdered form of carbon.

(d) Carburizing the tungsten and carbon mixture at temperatures in excess of 1100° C.

In another process as described in M. Miyake, A. Hara, T. Sho, "The Direct Production of WC from $WO_3$ by Using Two Rotary Carburizing Furnaces," Journal of Japan Society of Powder and Powder Metallurgy, Volume 26, No. 3, page 90, the $WO_3$ and carbon mix is pelletized and reacted in a series of two rotary furnaces. The first furnace operates in $N_2$ and allows reaction to $W+W_2C+WC+C$. The material is then fed directly into a second rotary furnace operating in $H_2$ for final carburization at a higher temperature. The use of pelletized $WO_3+C$ effectively reduces the boatload to a single pellet. However, this method requires control of the $CO-CO_2$ partial pressure ratio.

SUMMARY OF THE INVENTION

In the above mentioned process, the tungsten carbide powder particle size is controlled by controlling the tungsten powder particle size. Tungsten particle growth is affected by a water vapor deposition reaction which occurs in the reduction powder bed. To produce fine tungsten powder (0.5-2.5 micrometer) necessary for making fine tungsten carbide powder, shallow powder bed depths and high hydrogen flow rates are required.

A second method for producing fine WC powder is the direct reduction and carburization of tungsten oxides with carbon. The basic processing steps required are:

(a) Mixing of tungsten oxide with carbon powder.

(b) Firing the mixture in a nonreducing atmosphere to affect reduction of the oxide to W and subsequent carburization.

This method has the potential advantages for making fine WC of eliminating the water vapor deposition reaction and thereby allowing larger boatloads and subsequently increased productivity. In addition the number of basic processing steps is potentially cut in half.

It is very difficult to fully realize the potential advantages of the direct reduction and carburization method. Although the reaction can be written, using $WO_3$, as an example, as:

$$WO_3 + 2.5C = WC + 1.5CO_2$$

or $$WO_3 + 4C = WC + 3CO$$

in fact, WC is not formed directly. The order of reaction products formed from $WO_3$ appears to be: $WO_2$, W, $W_2C$, WC—the latter two controlled by the diffusion of C into the W.

Considering the possible reactions when firing $WO_3+C$ in conjunction with the minimum required temperatures determined by a zero change in free energy (G=O), we have:

(A) $2WO_3 + C = 2WO_2 + CO_2$ at $T \geq 330°$ C.

(B) $WO_3 + C = WO_2 + CO$ at $T \geq 515°$ C.

(C) $WO_2 + 2C = W + 2CO$ at $T \geq 820°$ C.

(D) $WO_2 + C = W + CO_2$ at $T \geq 878°$ C.

(E) $CO_2 + C = 2CO$ at $T \geq 714°$ C.

Therefore, the first reaction to occur would be (A) forming $WO_2$. As the product temperature increases, the $WO_2$ would be reduced to W by reactions (C) and (D). Since the minimum temperatures required for (C) and (D) are very close, both reactions are probable. In addition, the $CO_2$ evolved from (D) could undergo reaction (E), depending on the partial pressure of CO. The final formation of WC would be by solid state diffusion of carbon $$W + C = WC$$

and reaction with CO as $$W + 2CO = WC + CO_2$$

The complexity of these reactions make utilization of large boatloads very difficult. The low thermal conductivity of the powder bed in the furnace boats, produces a strong thermal gradient between the center and outer surfaces of the powder bed. This results in the center of the powder bed reacting at a later time. The $CO_2$ evolved from the reaction at the bed center must pass through the bed surface allowing reaction (E) to occur in these higher temperature surface portions of the bed. This depletes carbon from the outer portions of the powder bed necessary to complete the formation of WC. The result is a center core in the powder bed containing high percentages of carbide (WC and $W_2C$), while the top surface of the bed contains primarily W.

Production of tungsten carbide powder for the hard metal industries requires close control of total carbon in the product and very low free carbon. The presence of reaction (C), (D) and (E) make carbon control very difficult and totally dependent on the partial pressures of CO and $CO_2$. This, coupled with the thermal gradient problem in large powder beds, makes the necessary tight carbon control virtually impossible. The thermal gradient problem can be reduced by using shallow bed depths, but this defeats the potential advantage of the process and does not eliminate the required control of the CO and $CO_2$ partial pressures.

The present invention relates to the production of fine WC powder by direct reduction and carburization of tungsten precursors with carbon. The object of the invention is the use of this method to eliminate $H_2$ reduction, thereby eliminate W particle growth by the water vapor deposition reaction and to take advantage of the potential of substantially increased boatloads. To do this, we accept the inhomogeneous reaction products resulting from large boatloads of product and introduce additional processing steps to compensate.

In accordance with the present invention there is provided a process for producing tungsten carbide comprising mixing tungsten oxide or ammonium paratungstate with powder carbon to form a resulting mixture, reducing said resulting mixture in a non-reducing atmosphere for a sufficient period of time at a suitable temperature to produce resulting reduced mixture comprising tungsten, ditungsten carbide, and monotungsten carbide, said reducing being carried out in the presence of sufficient carbon to produce a carbon content of less than 6.13 percent by weight in said resulting reduced mixture, determining the carbon content of said resulting reduced mixture, adding sufficient carbon to said resulting reduced mixture to increase the carbon content to at least the stoichiometric amount needed to form monotungsten carbide, and carburizing said adjusted reduced mixture to form monotungsten carbide.

DETAILED DESCRIPTION

The processing steps of the invention are:

(a) Mixing of tungsten oxide or ammonium paratungstate with powdered carbon.

(b) Reducing the mixture in a nonreducing atmosphere to produce a resulting mixture of W, $W_2C$, and WC.

(c) The resulting mixture is preferable blended to produce a homogeneous blend and then sampled to determine the carbon total. Next, the carbon content is adjusted in the blend by addition of carbon and further blending.

(d) Carburizing the subsequently adjusted blend by normal carburizing techniques commonly used for W+C mixes.

In process step (a), sufficient carbon is added to assure a totalcarbon content less than about 7 percent, preferably between 0 and 6.13 weight percent after all oxide of tungsten are reduced. Mixing is preferably performed in a blender or ball mill. Mixing time should be sufficient to produce a uniform blend, i.e., generally 2 to 6 hours.

Step (b) is basically to reduce the tungsten oxides to produce at least partial carburization of the W. Temperatures in excess of 878° C. are necessary for reduction of all oxides of tungsten. Required time at temperature depends on temperature and the partial pressure of CO and $CO_2$. Reducing the partial pressures of CO and $CO_2$ decreases the required reaction time and can be accomplished by increased flow of a nonreducing gas, such as $N_2$ or argon, or by vacuum. The product produced in step (b) is a mixture of W, $W_2C$, WC and free carbon. The relative percentages of these products vary throughout the powder bed in the boats.

The purpose of the first blending in step (c) is to homogenize the W, $W_2C$, WC and free carbon produced in step (b). This is desirable to obtain a representative sampling for total carbon measurement. The homogenization can be done in a blender or ball mill. Based on the total carbon analysis of the homogenized mixture of W, $W_2C$, WC and free carbon, carbon is added to bring the total to the stoichiometry of WC. The carbon addition and additional mixing can be done in the same blender or ball mill; the powder need not be removed, only sampled for carbon total.

The carbon corrected W, $W_2C$, WC and free carbon mix produced in step (c) is then treated exactly as a standard W+C mix for carburization.

The powder mixture of tungsten and carbon is loaded in graphite boats or crucibles and fed to a furnace for heating. A resistance furnace such as, for example, a tube furnace has been found to be particularly suitable for heating although any furnace which will allow for heating to the desired temperature may be used. The powder mixture is heated to a temperature falling within a range of about 1200° C. to any temperature less than that which will melt monotungsten carbide, and such heating is continued for a time sufficient to carburize the tungsten (W) and carbon (C) powders to monotungstencarbide (WC). Although it is stated that the top of the heating range is any temperature less than that which will melt monotungsten carbide, it is generally believed that tungsten carbide melts at about 2600° C. to about 2880° C. In a preferred embodiment, heating occurs in a reducing atmosphere which is preferably hydrogen and in the absence of a vacuum.

After the boats have been moved through the furnace the monotungsten carbide is cooled and screened to remove excessively coarse agglomerates. Such screening may be through, for example, 100 mesh.

In producing a monotungsten carbide object, monotungsten carbide powder is first produced as described above. After screening, a binding agent is mixed with the cooled monotungsten carbide powder. In the preferred embodiment the binding agent comprises cobalt. One preferred mixture comprises about 90% by weight monotungsten cabide and about 10% by weight cobalt. When the cobalt is mixed with the monotungsten carbide, a hydrocarbon solvent such as heptane and a lubricant such as parafin wax may be added, the combined mixture being milled in an attritor mill. Subsequently, heat is applied to the mixture to evaporate the heptane. The remaining binding agent/monotungsten carbide mixture is pressed into a predetermined formed object which is sintered.

The process of the present invention allows for larger boatloads in the reduction step (b) as compared to the conventional hydrogen reduction of W. In making fine W, the conventional $H_2$ reduction has an output of about 0.2–0.3 kg/hr per furnace tube. This process has been operated with an output of 1.3–2.0 kg/hr per furnace tube. By producing partial carburization of the W in the reduction step (b), the powder has no pyrophoric tendency as does fine W produced by conventional hydrogen reduction. The pyrophoric tendency of fine W powder is due to the combination of high oxidation potential of W and the large surface area present in fine powders. In the process described by this invention, W is formed in the presence of carbon which allows diffusion of the carbon into the W particle. This surface shell substantially reduces the oxidation potential of the powder.

The WC powder produced by the invention makes hard metal having physical properties and microstructure equivalent to WC powder made by conventional method having fine powder particle size. The table below compares the physical properties of WC-6Co-0.2VC hard metal made from WC produced by this invention and by conventional carburization of W+C. Both hard metals were produced in an identical manner.

| PHYSICAL PROPERTIES OF WC-6Co-).2VC | | |
|---|---|---|
| | WC-New Process | WC-Conventional Process |
| WC Particle Size | | |
| FSSS | 1.38 m | 0.87 m |
| RMFSSS | 1.38 m | 0.87 m |
| Density | 14.95 g/cc | 14.95 g/cc |
| Coercivity | 324 Oe | 335 Oe |
| Linear Shrinkage | 18.6% | 19.9% |
| Hardness | 93.3 $R_A$ | 93.3 $R_A$ |
| 200X Porosity | A01, B01, C00 | A01, B01, C00 |

The uniqueness of a coarser WC powder producing equivalent hard metal properties has the additional advantage of lower linear shrinkage. This allows use of press tooling designed for lower shrinkage softer hard metal grades more commonly produced in the cemented carbide industry.

The process and product of this invention is more particularly explained in the following examples which are illustrative only. Those skilled in the art will recognize that there are numerous modifications and variations and that the present invention is not limited to such examples.

EXAMPLE 1

Two thousand grams of $WO_3$ and 310 g carbon black were mixed in a ball mill for 4 hours. The mixture was loaded into 12" long Inconel boats and stoked at 0.8 in/min through a 3.5" diameter, 3-zone furnace with each zone at 1121° C. in $N_2$ flowing at 21.6 cfh. Each furnace zone was 40 inches. The resulting powder was homogenized in a V-blender with an intensifier bar for 4 hours. X-ray diffraction showed this blend to be 13%WC, 60%W, and 27% $W_2C$. This would result in a combined carbon of 1.65 wt. percent. The measured carbon total was 3.45 wt. percent, indicating the powder contains 1.80 wt. percent free carbon. Additional carbon was added and the powder blended four more hours. The resulting mixture was carburized at 1250° C. in $H_2$ for 2.8 hours. Resulting WC powder had total carbon of 6.08 wt. percent and FSSS of 1.09 m.

A mixture of 188 g of the resulting WC with 12 g of Co, 0.4 g VC, 4 g paraffin, and 180 ml heptane was milled 3 hours in a 4" diameter laboratory attritor mill at 150 rpm. The milled mixture was dried, and pressed into CCPA standard test bars. The bars were dewaxed and sintered in vacuum at 1435° C. The resulting (WC-6Co-0.2VC) hard metal had the following physical properties:
Density—14.93 g/cc
Coercivity—349 Oe
Linear Shrinkage—17.9%
Hardness—93.0$R_A$
200X Porosity—A02,B00,C00

EXAMPLE 2

Two thousand grams of $WO_{2.83}$ and 296 g carbon black were mixed in a ball mill for 4 hours. The mixture was fired and homogenized as per Example 1. X-ray difraction showed the blend to comprise 10% WC, 61% W, and 29% $W_2C$. This results in a combined carbon of 1.53 wt. percent. The measured carbon total was 2.79 wt. percent, indicating a content of 1.26 wt. percent free carbon. Additional carbon was added and the powder blended 4 more hours. The resulting mixture was carburized as in Example 1.

The WC so produced had a total carbon of 6.25 wt. percent and FSSS of 1.00 m. This WC powder was made into hard metal as in Example 1. The resulting physical properties of the WC-6Co-0.2VC hard metal were:
Density—14.82 g/cc
Coercivity—295 Oe
Linear Shrinkage—18.0%
Hardness—92.9 $R_A$
200X Porosity—A02,B00,C06

EXAMPLE 3

A mixture of 2000 g of ammonium paratungstate and 310 g carbon black was made by ball milling 4 hours. The mixture was fired and homogenized as in Example 1. X-ray diffraction showed the blend to comprise 21% WC, 57% W, and 22% $W_2C$, resulting in a calculated combined carbon of 2.02 wt. percent. The measured total carbon was 4.79 wt. percent indicating 2.77 wt. percent free carbon. Additional carbon was added and the powder blended and additional 4 hours. The resulting blend was carburized as in Example 1.

The WC so produced had a total carbon of 6.05 wt. percent and FSSS of 1.20 m. This WC powder was used to make hard metal as in Example 1. The resulting physical properties of the WC-6Co-0.2VC hard metal were:
Density—14.86 g/cc
Coercivity—335 Oe
Linear Shrinkage—17.9%
Hardness—93.2 $R_A$
200X Porosity—A01,B01,C00

EXAMPLE 4

A mixture of 4000 g of ammonium paratungstate and 620 g carbon black was made by V-blending 4 hours. The mixture was fired and homogenized as in Example 1. X-ray diffraction showed the blend to comprise 10% WC, 65% W, and 24% $W_2C$, resulting in a calculated combined carbon of 1.37 wt. percent. The measurement total carbon was 4.11 wt. percent indicating 2.74 wt. percent free carbon. Additional carbon was added and the powder blended an additional 4 hours. The resulting blend was carburized as in Example 1.

The WC so produced had a total carbon of 6.12 wt. percent and FSSS of 1.23 m. This WC powder was used to make hard metal as in Example 1. The resulting physical properties of the WC-6Co-0.2VC hard metal were:
Density—14.89 g/cc
Coercivity—320 Oe
Linear Shrinkage—17.9%
Hardness—93.2 $R_A$
200X Porosity—A01,B01,C00

EXAMPLE 5

A mixture of 2000 g of $WO_3$ and 310 g graphite powder was made by ball milling 4 hours. The mixture was fired and homogenized as in Example 1. X-ray diffraction showed the blend to comprise 5% WC, 21% W, and 74% W₂C, resulting in a calculated combined carbon of 2.65 wt. percent. The measured total carbon was 2.54 wt. percent indicating 0 free carbon. Additional carbon was added and the powder blended an additional 4 hours. The resulting blend was carburized as in Example 1.

The WC so produced had a total carbon of 6.15 wt. percent and FSSS of 1.10 m. This WC powder was used to make hard metal as in Example 1. The resulting physical properties of the WC-6Co-0.2VC hard metal were:
Density—14.97 g/cc
Coercivity—302 Oe
Linear Shrinkage—19.1%
Hardness—93.1 R$_A$
200X Porosity—A01,B03,C00

EXAMPLE 6

A mixture of 3225 kg of WO₃ and 500 kg carbon black was made by ball milling 4 hours. The mixture was fired and homogenized as in Example 1. X-ray diffraction showed the blend to comprise 21% WC, 40% W, and 21% W₂C, resulting in a calculated combined carbon of 3.05 wt. percent. The measured total carbon was 3.36 wt. percent indicating 0.31 wt. percent free carbon. Additional carbon was added and the powder blended an additional 4 hours. The resulting blend was carburized as in Example 1.

The WC so produced had a total carbon of 6.12 wt. percent and FSSS of 1.38 m. This WC powder was used to make hard metal as in Example 1. The resulting physical properties of the WC-6Co-0.2VC hard metal were:
Density—14.95 g/cc
Coercivity—358 Oe
Linear Shrinkage—18.6%
Hardness—93.5 R$_A$
200X Porosity—A01,B02,C00

We claim:

1. A process for producing a non-pyrophorric fine tungsten carbide powder having low free carbon comprising (a) mixing tungsten oxide or ammonium paratungstate with powder carbon to form a resulting mixture, (b) substantially reducing the resulting mixture in a non-reducing atmosphere for a sufficient period of time and at a temperature greater than 878 degrees Centigrade to reduce oxides of tungsten present in said resulting mixture and produce at least a partially carburized mixture consisting essentially of tungsten, ditungsten carbide, monotungsten carbide and free carbon, said reducing being carried out in a boat having a bed depth of said resulting mixture whereby the surface of said bed after reducing is depleted in carbon and comprises tungsten and the center core of said bed comprises a higher percentage of monotungsten carbide and ditungsten carbide than said surface, said reducing being carried out in the presence of sufficient carbon to at least partially carburize said mixture and produce a total carbon content including chemically combined carbon and free carbon of less than the stoichiometric amount needed to produce monotungsten carbide, (c) removing said partially carburized mixture from said boat and mixing to form a homogenous mixture, (d) sampling said homogeneous mixture to determine the deficiency of carbon below the stoichiometric amount needed to make monotungsten carbide, (e) adding sufficient carbon powder to said homogeneous mixture to form an adjusted mixture having a total carbon content at the stoichiometric amount needed to make monotungsten carbide, (f) blending the adjusted mixture to form a homogeneous mixture, and (g) carburizing said adjusted mixture in a hydrogen atmosphere at a suitable temperature to form a nonpyrophorric monotungsten carbide having low free carbon.

* * * * *